Oct. 6, 1936.    R. E. LASLEY    2,056,198
POWER PLANT
Filed Aug. 18, 1934    4 Sheets-Sheet 2
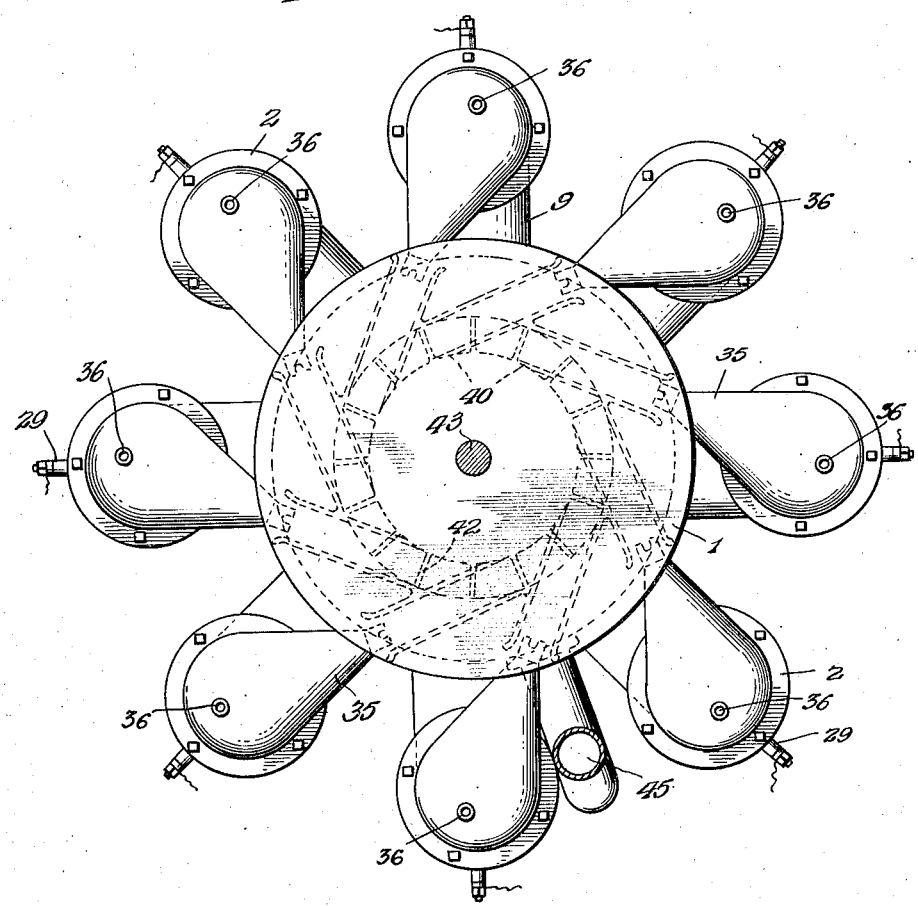
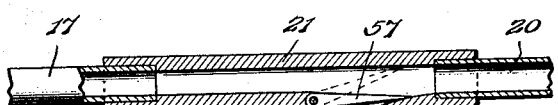
Inventor
R. E. Lasley.

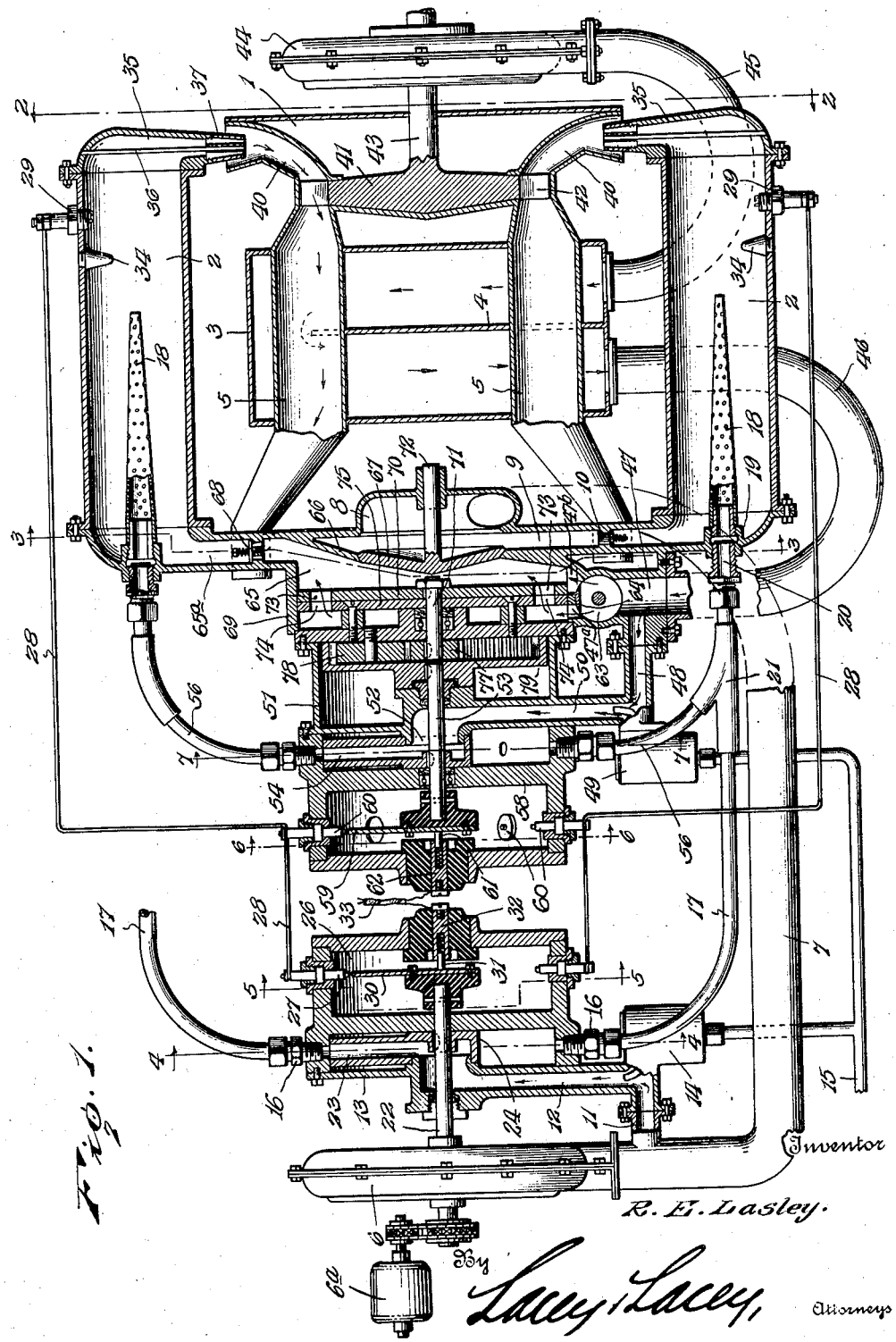

Oct. 6, 1936.      R. E. LASLEY      2,056,198
POWER PLANT
Filed Aug. 18, 1934      4 Sheets-Sheet 3
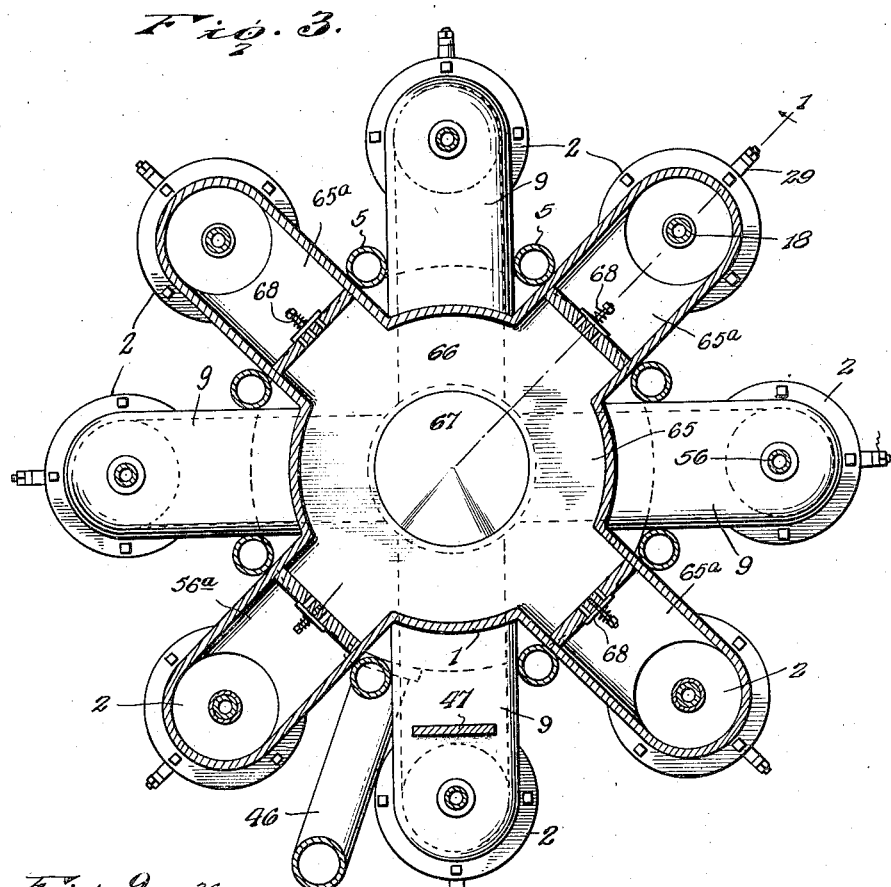
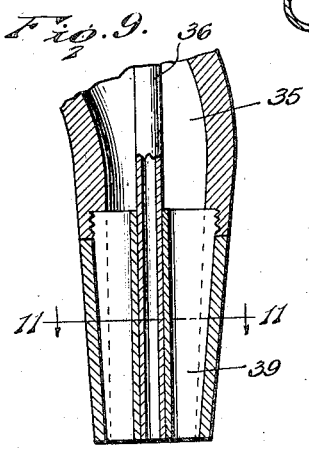
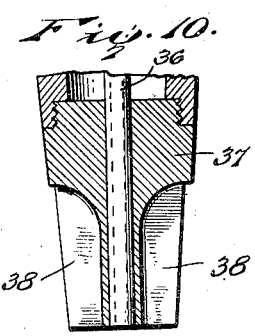
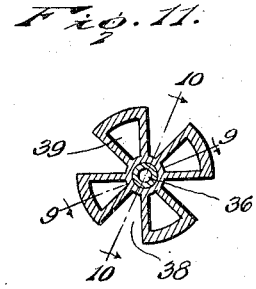
Inventor
R. E. Lasley.
By Lacey & Lacey
Attorneys Oct. 6, 1936.                R. E. LASLEY                2,056,198
                              POWER PLANT
                         Filed Aug. 18, 1934          4 Sheets-Sheet 4

Inventor
R. E. Lasley.
By Lacey & Lacey,
Attorneys

Patented Oct. 6, 1936

2,056,198

UNITED STATES PATENT OFFICE 2,056,198

POWER PLANT

Robert E. Lasley, Waukegan, Ill.

Application August 18, 1934, Serial No. 740,524

11 Claims. (Cl. 60—41)

This invention relates to power plants in which the force of an explosion furnishes the operating power, and one object of the invention is to provide novel means for feeding air to the combustion chamber and to augment the entraining of air by dividing the hot gases from the combustion chamber into several streams and thereby presenting a greater surface of the hot gases to the atmosphere. Another object of the invention is to provide means whereby the motor may be operated under a lower pressure until full power has been developed, and it is also an object of the invention to provide novel means for controlling the ignition and the distribution of the fuel. These stated objects and other objects which will appear incidentally in the course of the following description are attained in such an apparatus as is illustrated in the accompanying drawings, and the invention resides in certain novel features which will be particularly pointed out in the claims.

In the drawings:

Figure 1 is a view, partly in elevation and partly in longitudinal section along the line 1—1 of Figure 4, of a power plant embodying the present invention.

Figure 2 is an end elevation with parts in section on the line 2—2 of Figure 1.

Figure 3 is a section on the line 3—3 of Figure 1.

Figure 8 is a detail longitudinal section through the fuel distributing conduit.

Figure 9 is a longitudinal section through the discharge nozzle from the combustion chamber taken along the line 9—9 of Figure 11.

Figure 10 is a section of the same nozzle taken at an angle to Figure 9 along the line 10—10 of Figure 11.

Figure 11 is a detail section taken transversely through the nozzle on the line 11—11 of Figure 9.

Figure 4:
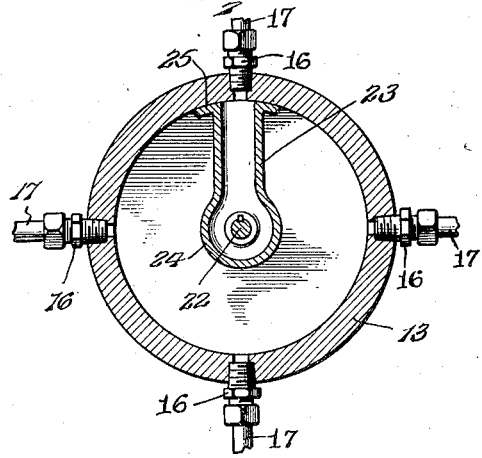
Figure 4 is a section through the primary or starting fuel distributor taken along the line 4—4 of Figure 1.
Figure 5:
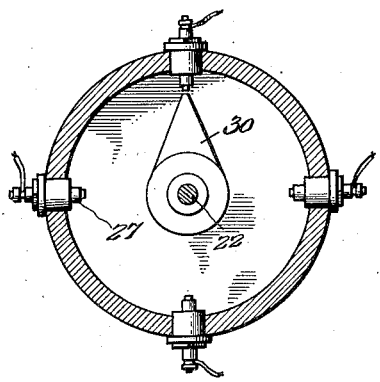
Figure 5 is a similar section on the line 5—5 of Figure 1 of the starting ignition control.
Figure 6:
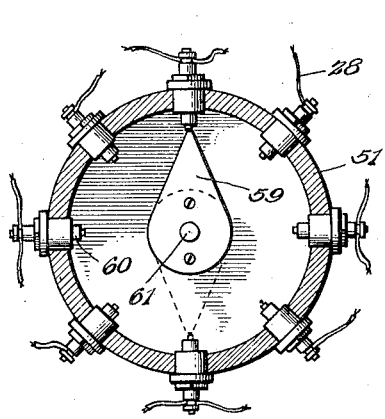
Figure 6 is a section on the line 6—6 of Figure 1 through the main ignition control.
Figure 7:
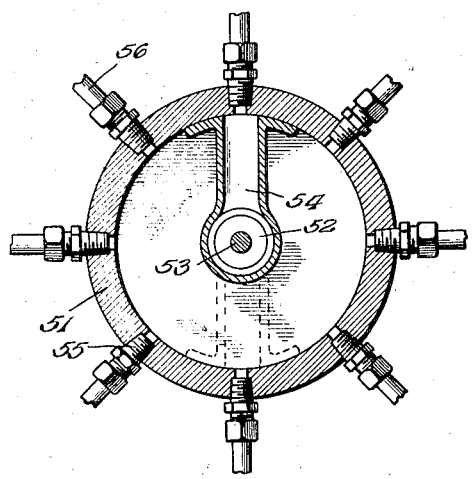
Figure 7 is a section on the line 7—7 of Figure 1 showing the main fuel distributer.

In carrying out the present invention, there is provided a substantially cylindrical casing 1 about which are disposed a series of combustion chambers 2, eight of such chambers being shown and being generally employed. Within the casing 1 is a pre-heater 3 consisting of a cylinder or box having a central partition 4 which extends from one end or side wall of the box toward the opposite wall, but terminates short of said opposite wall, as clearly shown in Figure 1. Exhaust conduits 5 from the several combustion chambers extend through the pre-heater and thence discharge into the open air and these conduits convey exhaust gases from the several combustion chambers through the pre-heater so that the heat of the exhaust gases will be given off and will act to raise the temperature of the air fed to the turbines and to the fuel conduits.

A starting blower or compressor 6 is provided and may be of any desired form and is illustrated conventionally. An air conduit 7 leads from this compressor or blower to discharge into a head 8 within the casing 1 and from said head conduits 9 lead to some of the combustion chambers to deliver the air thereto. Four of the conduits 9 are provided and they lead respectively to the four combustion chambers which are brought into service during the starting period, a check valve 10, of any approved form, being mounted within each conduit, as shown. A branch fitting 11 is mounted upon one side of the conduit 7, adjacent the blower or compressor 6 and this fitting is coupled to a pipe 12 which leads into a fuel distributer casing 13 which is preferably cylindrical. A carbureter, shown conventionally at 14, is also connected with the pipe 12 and a fuel line 15 supplies said carbureter. Spaced equidistantly around the circumferential wall of the distributer casing 13 are nozzles 16 from which fuel pipes 17 lead into the starting combustion chambers. Within each combustion chamber is mounted a tapered perforated discharge nozzle 18 and this nozzle is supported by a boss or equivalent member 19 formed on the end wall of the combustion chamber and coupled, through a short pipe 20, with a Y-fitting 21, the end of the fuel pipe 17 being secured in the outer end of the straight branch of the Y-fitting, as shown most clearly in Figure 8. The shaft 22 of the blower or compressor 6 extends through the fuel distributer casing 13 and within said casing has secured thereon a distributer tube 23 which has a circular inner end, shown at 24, disposed concentric with the shaft and has its outer end flanged, as shown at 25, and fitting close against the inner circumferential surface of the casing. This tube has an opening in one side at its inner end whereby communication with the inlet pipe 12 is established, as will be understood upon reference to Figure 1, and it will be readily seen that as the blower and the shaft 22 rotate, air and fuel will be blown through the pipe 12 into the distributing tube 23 and by it directed successively into the several nozzles 16 to pass to the combustion chambers. The shaft 22 also extends into an ignition control casing 26 which is arranged coaxially with the casing 13 and has one wall in common therewith, as shown in Figure 1. In the circumferential wall of the casing 26 are mounted contacts 27 which are connected electrically through conductors 28 with spark plugs 29 located in the respective combustion chambers. Secured on the end of the shaft 22 within the casing 26, but insulated from said shaft, is a metallic distributer arm 30 which, as the shaft rotates, will successively close the circuit through the respective contacts 27 and the associated spark plugs. The distributer arm 30 is provided, in alinement with the shaft, with a terminal 31 which fits within a metal bushing 32 mounted in but insulted from the inner end wall of the casing 26 and having attached thereto a high tension ignition wire 33. It will now be understood that the rotation of the shaft 22 will cause the distributer tube 23 and the distributer arm 30 to operate in unison and a rich mixture of fuel and air will be blown into the distributer tube 23 and discharged into the several pipes 17 to be delivered into the respective combustion chambers and at the same time, at proper intervals, the delivered fuel mixture will be exploded by means of a spark at the spark plugs. To insure the explosion of the fuel mixtures and prolong the life of the spark plugs, I provide a hot point 34 in each combustion chamber which will serve to explode the mixture after the motor has been running a short while and the combustion chambers have been raised to a high temperature.

Each combustion chamber is provided with a discharge nozzle 35 at its rear end and this nozzle will direct the escaping products of combustion toward the axial line of the apparatus. The nozzle is provided with a central air inlet tube 36 which is open at both its ends and has one end disposed within a wall of the nozzle and its other end extended beyond the mouth of the nozzle to fit within a distributer and divider secured in the end of the nozzle. This distributer and divider consists of a head 37 which will fit within the end of the nozzle and lie flush with the outer surface of the nozzle, but is preferably secured in place by screw threads, as will be understood upon reference to Figures 9 and 10. The tube 36 extends axially through the head 37 and in the sides of the head are formed grooves 38 through which atmospheric air may be drawn by suction created by the air escaping through the tube 36 and through passages 39 formed through the divider alternately with the grooves 38. The passages 39 communicate directly with the interior of the nozzle, as clearly shown in Figures 1 and 9, and the hot exhaust gases will flow through these passages with considerable velocity which will be augmented by the relatively diminished cross sectional area of the passages. This divider is tapered toward its free end and fits within the open end of a funnel 40 which directs the gases and the air taken up thereby onto a turbine 41 which is mounted in the end of the main casing 1 and has blades 42 around its periphery which will be disposed in the path of the gases and air delivered into the funnel.

As shown in Figure 1, the mouth of the funnel is in spaced relation to the divider so that atmospheric air will be drawn into the funnel around the divider and will commingle with the gases flowing from the discharge nozzle. It will be readily noted that this construction causes heated gases escaping from the respective combustion chambers to be divided into several streams so that a large volume of air will be entrained by the suction resulting from the forcible escape of these gases. The exhaust conduits 5, it will be noted, are of much greater diameter than the funnels and the passages defined for the blades of the turbine, so that as the gases enter these exhaust conduits, they will expand and rapidly give off their heat so that the temperature within the pre-heater will be raised. The turbine 41 has its shaft 43 extended through the end of the casing 1 and carries the working element of a blower or compressor 44. The shaft, as shown clearly in Figure 1, extends through the compressor and may be coupled to machinery to be driven.

A conduit 45 leads from the main compressor or blower 44 and discharges into one side of the pre-heater 3, as clearly shown in Figure 1. A second conduit 46 leads from the pre-heater and discharges into a valve casing 47 which is arranged adjacent the forward end of the main casing. A branch pipe 48 extends from the valve casing 47 to be connected with a second carbureter 49, which is indicated conventionally, and connected with the fuel line 15. The branch pipe 48 also communicates with a lateral branch 50 which extends into a casing 51 and has a discharge opening 52 concentric with a shaft 53 disposed centrally in said casing. Secured upon said shaft and rotatably fitted upon the discharge mouth 52 of the branch pipe is a tubular fuel distributing valve 54 corresponding in all essential respects to the previously described distributing valve 23. Equally spaced nozzles 55 are mounted in the circumferential wall of the casing 51 and fuel pipes 56 lead from the respective nozzle to the several combustion chambers, it being noted that eight nozzles 55 are provided. Each fuel pipe 56 has its end fitted in the curved branch of a Y-fitting 21 so as to deliver into a discharge nozzle 18 which is also supplied by a fuel pipe 17, a flap valve 57 being mounted in the fitting at the junction of the two arms thereof so that it will be swung to one side by the inflowing fuel and consequently will close the exhaust from the pipe 56 or the pipe 17, according to which pipe is delivering the fuel. It is also to be understood that the alternate combustion chambers are supplied by only one fuel pipe and, consequently, the Y-fittings will not be needed at the alternate combustion chambers.

The shaft 53 is extended through the central wall or partition 58 of the casing 51 and a distributer arm 59 is secured to but insulated from the end of the shaft. This distributer arm 59 corresponds in all essential respects to the distributer arm 30, previously described, and cooperates with contact elements 60 mounted in the circumferential wall of the casing equidistant about the same and connected with the spark plugs 29 in the respective combustion chamber through the conductors 28 which also connect the contacts 27 with the spark plugs. The distributer arm 59 carries a terminal 61 in alinement with the shaft 53 and this terminal fits within a bushing 62 corresponding in all respects to the previously mentioned bushing 32 and having a grounded return in common with said bushing 32.

A regulating valve 63 is mounted in the upper end of the valve casing 47 and this valve may be set or adjusted through any convenient means. The valve casing is provided with two outlet ports 47ª and 47ᵇ in its upper end above the valve, as shown clearly in Figure 1, and the web 64 of the valve may be set to close either of said ports or to permit the inflowing air to be divided between the two ports. The port 47ᵇ nearer the front end of the main casing 1 communicates with a passage 65 formed in the end wall of the main casing by a partition 66 which has a central opening therethrough providing a seat for a disk valve 67. The valve 67, as clearly shown, when seated, forms one wall of the passages 9 leading to the combustion chambers used when starting the motor and separates said passages from the passage 65. The passage 65 has passages 65ª communicating with the remaining combustion chambers and is equipped with a check valve 68 corresponding in all respect to the check valve 10, previously mentioned. These check valves will permit flow to the combustion chambers but will prevent flow from the chambers.

Figure 12:
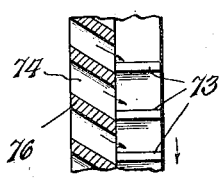
Figure 12 is a detail section showing the manner in which the air is admitted to the distributor turbine.

The valve casing 47 is preferably formed integral with a rim or boss 69 formed on the end of the main casing and housing a turbine 70 which is secured upon a shaft 71 disposed in alinement with the shafts 53 and 22. It may also be noted that the valve 67 has a stem 72 disposed in alinement with the several shafts and slidably mounted in the side of the chamber 8. The turbine 70 has its blades, indicated at 73, arranged in an annular series adjacent a corresponding series of openings 74 in a wall or partition 75 which forms a part of the rim or casing 69. In Figure 12, the blades 73 are shown in their relation to louvers 76 in the series of openings 74 so that the hot air escaping through the openings 74 will impinge upon the blades 73 at a proper angle to propel the turbine instead of merely passing through the spaces between the blades. The turbine is keyed upon the shaft 71 so that the rotation of the turbine imparted thereto by the flowing hot air, in the manner just stated, will be transmitted through the shaft 71 to a gear 77 fixed upon the shaft and meshing with a transmission gear 78 which, in turn, meshes with a ring gear 79 which is keyed upon the shaft 53 so that the shaft 53 will be rotated at less speed than the shaft 71.

It is thought the operation will now be understood. When the starting blower or compressor 6 is set in motion by a starter 6ª of a conventional construction, air will be driven under pressure into the chamber 8, at the end of the main casing, and thence will flow through the several conduits 9 into the combustion chambers connected with said conduits. Fuel will also be drawn from the carbureter 14 by air forced through the passage 12 and by mixing with the air form a rich fuel mixture which passes into the fuel distributer 23 and is sent through the pipe 17 into those same combustion chambers, escaping through the discharge nozzles 18 in the center of the body of air which passes from the conduits 9 to mix with this air and form a combustible mixture. The distributer 30 will be simultaneously operated to create sparks at the several spark plugs 29 so that the fuel mixture will be exploded and the gases will pass out through the discharge nozzles 35 to drive the turbine 41 and raise the temperature of the air in the pre-heater, as has been described. The turbine 41 being thus set in motion will operate the main compressor or blower 44 so that air will be driven through the pre-heater into the valve casing 47, as has been explained. From the valve casing 47, the air will flow in divided streams. One stream will suck fuel from the carbureter 49 and deliver it into the distributing valve 54 and another stream will pass through the port 47ᵇ and passage 65 into the combustion chambers which communicate with the passages 65. A third stream will pass through the port 47ª and passages 74 to actuate the turbine 70 so that the fuel distributer 54 and the ignition control arm 59 will both be rotated and supply fuel to the combustion chambers and create a spark at the spark plugs. Eventually, the pressure in the chamber 65 will be built up so that it will exceed the pressure in the chamber 8 and, consequently, the valve 67 will be slid laterally so that it will uncover the opening in the partition 66 and close the inner side of the chamber 8 so that flow from said chamber will be cut off and the starting blower or compressor will be stopped. Some of the air flowing through the passage 65 will then be directed into the conduits 9 which were previously fed from the chamber 8 so that all of the combustion chambers will be receiving air from the conduit 46 and fuel from the pipes 56.

The mechanism of the present invention provides for a rapid acceleration during the starting period and will automatically cut off the starting blower and connect all the combustion chambers with the main fuel supply.

Having thus described the invention, I claim:

1. In a power plant, a combustion chamber, a conduit for delivering air under pressure into the combustion chamber, having a chamber intermediate its length, an auxiliary chamber receiving air from the conduit and having outlet ports for delivering air into the chamber of the conduit, means for delivering a rich fuel mixture into the combustion chamber to mix with the air and form a combustible mixture including a rotary distributing valve, a rotary shaft carrying said valve, firing means including a timer actuated by rotation of said shaft, means to control the quantity of air passing through the auxiliary chamber, a rotary drive shaft, a turbine fixed to said drive shaft and disposed in the chamber of said conduit and driven by the air leaving the auxiliary chamber through the outlet ports thereof, and means for transmitting rotary motion from the drive shaft to the shaft carrying the distributing valve.

2. In a power plant, a combustion chamber, a conduit for delivering air under pressure into the combustion chamber having a chamber intermediate its length, an auxiliary chamber receiving air from said conduit for delivering air into the chamber of the conduit, means for delivering a rich fuel mixture into the combustion chamber to mix with the air and form a combustible mixture including a housing alined with the auxiliary chamber, a rotary distributing valve in said housing having a shaft journaled through walls of the housing, firing means including a timer having a movable contact carried by the rotary shaft, a rotary drive shaft alined with the distributer shaft and extending through the auxiliary chamber into the chamber of the conduit, means for transmitting rotary motion from the drive shaft to the distributer shaft, and a turbine carried by the drive shaft within the chamber of the conduit actuated by air passing from the auxiliary chamber.

3. In a power plant, a cylinder, a second cylinder, a starting blower, a conduit for delivering air under pressure from the starting blower into the first-mentioned cylinder, a main blower, a conduit for delivering air under pressure from the main blower to the second cylinder, said conduits having portions intercommunicating, a valve for controlling communication between the said portions of said conduits moved to adjusted positions by air pressures in the conduits and when open permitting flow of air through the main blower to both cylinders, means for intermittently delivering charges of rich fuel mixture into said cylinders including a rotary distributing valve, and actuating means for the distributing valve operated by air blowing through the conduit of the main blower.

4. In a power plant, a cylinder, a second cylinder, a starting blower, a conduit for delivering air under pressure from the starting blower into the first-mentioned cylinder, a main blower, a conduit for delivering air under pressure from the main blower to the second cylinder, said conduits having portions intercommunicating, a valve for controlling communication between the said portions of said conduits moved to adjusted positions by air pressures in the conduits and when open permitting flow of air from the main blower to both cylinders, means for intermittently delivering charges of rich fuel mixture into said cylinders to mix with the air and form a combustible mixture, and firing means associated with the cylinders.

5. In a power plant, a cylinder, a second cylinder, a starting blower, a conduit for delivering air under pressure from the starting blower into the first-mentioned cylinder, a main blower, a conduit for delivering air under pressure from the main blower to the second cylinder, said conduits each having a chamber intermediate its length, the chambers being separated by a partition having an opening to establish communication between the chambers, a valve movable into and out of position to close the opening and being moved to an open position by air pressure in the chamber of the main conduit and when open permitting flow of air from the main blower to both cylinders, means for intermittently delivering charges of rich fuel mixture into the cylinders to mix with the air and form a combustible mixture, and firing means associated with the cylinders.

6. In a power plant, a cylinder, a second cylinder, a starting blower, a conduit for delivering air under pressure from the starting blower into the first-mentioned cylinder, a main blower, a conduit for delivering air under pressure from the main blower to the second cylinder, said conduits each having a chamber intermediate its length, the chambers being separated by a partition having an opening to establish communication between the chambers, a valve movable into and out of position to close the opening and being moved to an open position by air pressure in the chamber of the main conduit and when open permitting flow of air from the main blower to both cylinders, means for intermittently delivering charges of rich fuel mixture into the cylinders to mix with the air and form a combustible mixture including a rotary distributing valve, actuating means for the distributing valve including an operating element mounted in the chamber of the main conduit and driven by air passing through the chamber whereby charges of fuel mixture will be fed to the cylinders in metered and timed relation to filling of the cylinders with air from the main blower, and firing means associated with the cylinders.

7. In a power plant, a cylinder, a second cylinder, a starting blower, a conduit for delivering air under pressure from the starting blower into the first-mentioned cylinder, a main blower, a conduit for delivering air under pressure from the main blower to the second cylinder, said conduits each having a chamber intermediate its length, the chambers being separated by a partition having an opening to establish communication between the chambers, a valve movable into and out of position to close the opening and being moved to an open position by air pressure in the chamber of the main conduit and when open permitting flow of air from the main blower to both cylinders, means for intermittently delivering charges of rich fuel mixture into the cylinders to mix with the air and form a combustible mixture including a rotary distributing valve having a rotatably mounted shaft, a rotary drive shaft, a turbine carried by said drive shaft and disposed in the chamber of the main conduit whereby rotary motion will be imparted to the turbine and drive shaft by air flowing through the chamber, means for transmitting rotary motion from the drive shaft to the distributer-valve shaft, and firing means including a timer having a movable contact carried by the distributer-valve shaft.

8. In a power plant, a cylinder, a second cylinder, a starting blower, a conduit for delivering air under pressure from the starting blower into the first-mentioned cylinder, a main blower, a conduit for delivering air under pressure from the main blower into the second cylinder, said conduits having portions intercommunicating, a valve for controlling communication between the said portions of said conduits moved to adjusted positions by pressure of air in the conduits and when open permitting flow of air from the main blower to both cylinders, means for intermittently delivering charges of rich fuel mixture into the starting cylinder including a rotary distributing valve actuated from the starting blower, firing means for the starting cylinder including a timer actuated from the starting blower, means for intermittently delivering charges of rich fuel mixture into both cylinders including a rotary distributing valve having a rotatably mounted shaft, actuating means for imparting rotation to said shaft including a turbine driven by air fed from the main blower, and a timer for controlling firing of all of said cylinders having a movable contact carried by the rotatable shaft.

9. A power plant comprising a plurality of combustion chambers, a conduit for supplying air under pressure to certain of the chambers, a conduit for supplying air under pressure to the remaining chambers having a portion communicating with the first conduit whereby air from the second conduit may be supplied to all of the chambers, means responsive to pressure of air supplied from the second conduit for controlling communication between the conduits, means for supplying a rich fuel mixture successively to the combustion chambers to mix with air therein and form a combustible mixture, and means for firing the combustible mixtures in the chambers.

10. A power plant comprising a plurality of combustion chambers, conduits for delivering air under pressure in said chambers, said conduits having portions disposed side by side and divided by a wall formed with an opening to establish communication between the conduits, and a slidably mounted valve responsive to pressure of air in the conduits and movable thereby into and out of position for closing the opening whereby to preliminarily admit air to only certain of the combustion chambers when the valve is closed and subsequently under increased air pressure in one conduit being moved to an open position to admit air to all of the combustion chambers from the same source.

11. In a power plant, a combustion chamber, means for delivering air under pressure to said combustion chamber, an exhaust conduit, a turbine rotatably mounted and having blades extending radially and moving through the exhaust conduit when the turbine is rotated, a discharge nozzle for said combustion chamber, a divider extending from the mouth of the discharge nozzle into the exhaust chamber and formed with passages communicating with the nozzle, the divider also having grooves in its outer surface disposed in alternating relation to the passages for entraining atmospheric air and drawing the air into the exhaust conduit, and an open-ended tube extending through the nozzle and axially through the divider between the passages whereby air will be mixed with products of combustion discharged through the passages of the divider to cool and add weight to the products of combustion and act against blades of the turbine to impart rotation to the turbine.

ROBERT E. LASLEY.